United States Patent Office 3,451,837
Patented June 24, 1969

3,451,837
DECORATIVE COATING FOR HARDBOARD
Alfred N. Mork, Riverside, Calif., assignor to Celanese Coatings Company, New York, N.Y., a corporation of Delaware
No Drawing. Filed June 9, 1966, Ser. No. 556,264
Int. Cl. B44d 1/14; B44c 5/04
U.S. Cl. 117—12      4 Claims

ABSTRACT OF THE DISCLOSURE

Decoratively coated hardboard is provided by applying to the hardboard a multicoat coating system which can be dried and cured in one baking operation. The coating system is made up of a filler coat, a pigmented base coat, an undertone printing coat, a toptone printing coat, and a clear protective coat superposed on and applied in sequence to the hardboard.

---

This invention relates to a decorative coating for wallboard. In particular, this invention pertains to a multicoat decorative finish for hard board and to a process for applying the finish with production line equipment in a relatively short time.

The word "wallboard" is a general term of the construction industry and is applied to large boardlike materials used on or as a wall. Wallboards are classified into several general types. The types used in this invention are called hardboard and semihardboard, but will be referred to hereinafter as hardboard. Hardboards are made from wood fibers which are pressed together with steam and pressure into high-density, small-thickness building board. Masonite is a trade name applied to a hardboard of this classification. Other types of hardboard are those which contain organic resins which bond the wood fibers together. Descriptions of hardboard and semihardboard and the process for their manufacture are given in Encyclopedia of Chemical Technology by Kirk and Othmer, vol. 14, pages 875–895, Interscience Encyclopedia, Inc., New York (1955).

Hardboard, as produced, is generally brown in color with an appearance which is not considered desirable for interior panelling and other related uses. However, by the proper application of decorative finishes, hardboard has been made to resemble a wide variety of building materials. Facsimiles of mahogany, cherry, walnut and other types of wood panels have been made as well as panels which have the appearance of marble, tile, and various other surfaces. These decorative finishes are made from coating systems which are comprised of at least three coats, a base coat, a pattern coat and a clear coat to protect the pattern from wear. Heretofore, the application and cure of these finishes required an overall time of at least 15 minutes and more generally, times in the order of 30 minutes or more. Such long processing times resulted in inefficient utilization of equipment and low production of the finished hardboard.

This invention proposes a unique decorative multi-coat system for hardboard. By the use of the coating system of this invention, five coats can be applied to hardboard and all the coatings can be dried and cured in one baking operation. The total time for the operations, i.e., the time when the first coating is applied until the finished hardboard is produced, is 3.5 minutes or less. This coating system is readily adaptable to production line processing and enables the manufacturer to reach and maintain a high production rate with very efficient utilization of equipment.

The coating composition of this invention is comprised of:

(a) A filler coat; (b) a base coat; (c) an undertone printing coat; (d) a toptone printing coat; and (e) a clear top or protective coat. These coatings are applied to the hardboard with roller coaters and curtain coaters. The filler coat is preferably applied to the hardboard using a reverse roll coater. The base coat is applied by use of a direct roller coater. The printing coats are applied by a rotogravure printing process wherein the pattern is etched on a metal roll, the roll is inked and the inked pattern is transferred to a rubber roll which contacts the surface to be printed. The clear top coat is applied by a curtain coater. Roller coaters, reverse roll coaters, rotogravure printers and curtain coaters are well known to those skilled in the art and will not be dealt with in detail. Descriptions of this type equipment can be found in Organic Coating Technology, vol. 2, by H. F. Payne, John Wiley & Sons, Inc., New York (1961) and in Encyclopedia of Polymer Science and Technology, vol. 3, Interscience Publishers, New York (1965).

In carrying out the coating of hardboard using the coating composition of this invention, the coating equipment is arranged in tandem. The hardboard in the form of large sheets, generally 4 feet by 8 feet, is fed into the reverse roll coater where the filler coat is applied. Upon leaving this coater, the coated sheet is given a 10 second flash with hot air at about 125° F. to 150° F. and is then fed into a direct roller coater for the application of the base coat. After a 10 second flash at the same temperature, the sheet enters the printer roller coater where the undertones of the desired design are applied. Again, after a 10 second flash at 125° F. to 150° F., the sheet is printed with the toptone followed by a similar 10 second flash. The sheet then passes through the curtain coater where the clear topcoat is applied. The coated sheet is then introduced into a multistage oven having progressively increasing temperatures from about 250° F. to about 350° F. where the sheet is heated to a surrface temperature of about 265° F. to about 285° F., as measured by a pyrometer, to bake and cure all the coatings in one operation. The final heating step lasts for about 90 seconds. The total time from start to finish requires a maximum of 3.5 minutes and can be conducted in times as low as 2.5 minutes.

The coating composition of this invention represents a balance of components which are quick drying and compatible, but which will not intermix or bleed together while in the wet or uncured stage. The filler coat is generally untinted and is used to fill depressions and imperfections in the hardboard in order to obtain a smooth surface. The base coat is a pigmented coating which is used to cover and hide the filled surface and to give the panel the desired color. The undertone and toptone printing coatings are referred to by the trade as ink. The desired design is first applied by the undertone ink and then the design is superimposed on the undertone with the toptone ink. The proper use of undertone and toptone gives the design a natural effect especially in the reproduction of wood grains. The top coat is a clear coating, which can be a semigloss or high gloss. The topcoat protects the design from damage and gives the panel a wanted lustrous appearance.

The filler coating composition of this invention is composed of extender pigments and an organic film forming composition which is an alkyd resin modified with 30 to 40 weight percent drying oil and 3 to 6 weight percent rosin-maleic anhydride adduct, the percentages being based on the total weight of the film forming composition. The weight ratio of extender pigments to organic film forming composition can be varied between about 4 to 10 parts of pigment to 1 part of film former and preferably 6 to 8 parts of pigment to 1 part of film former.

Pigments which lack opacity and contribute little to the hiding power of paint are known as extender pigments. Extender pigments which can be used in the filler coating composition include barium sulfate (barytes), calcium sulfate (gypsum), calcium carbonate (whiting), magnesium carbonate, silica (quartz, diatomaceous earth), magnesium silicate, talc, clays, wollastonite and the like. Minor amounts of hiding pigments, such as titanium dioxide, can also be used if desired.

The organic film forming composition is preferably a quick drying resin. Such resins are obtained by modifying an alkyd resin, which is the reaction product of an aromatic dicarboxylic acid or anhydride and an aliphatic polyol, with a drying oil and a rosin-maleic anhydride adduct. The aromatic dicarboxylic acid anhydride and the aliphatic polyol are reacted in the mol ratio of approximately 1 to 1. Suitable anhydrides are phthalic anhydride, tetrahydrophthalic anhydride and hexahydrophthalic anhydride. Also included are acids of these anhydrides as well as isophthalic and terephthalic acid. Phthalic anhydride is the preferred component.

Aliphatic polyols suitable for use in preparing alkyd resins are glycerine, trimethylol ethane, trimethylol propane, pentaerythritol and the like. Preferred polyols are the trihydric alcohols with the most preferred being trimethylol ethane.

Drying oils are triglycerides of unsaturated fatty acids. Suitable drying oils include dehydrated castor oil, linseed oil, tung oil, oiticica oil, perilla oil, soybean oil, tall oil, and the like. The preferred drying oil is dehydrated castor oil.

The quick drying characteristics of the film forming composition used herein are enhanced by the incorporation of the rosin-maleic anhydride adduct. This adduct is prepared by co-reacting gum rosin, maleic anhydride and glycerine in the weight proportions of about 75 to 85 parts of rosin to 5 to 15 parts of maleic anhydride and 8 to 16 parts of glycerine.

Film forming compositions particularly useful for this invention contain by weight 30 to 40 parts of dehydrated castor oil, 50 to 60 parts of trimethylol ethane phthalate, and 3 to 6 parts of rosin-maleic anhydride adduct.

The coating compositions are reduced to application viscosities with suitable organic solvents, such as esters, ethers, ketones and preferably aromatic hydrocarbons. The compositions at application viscosity generally have a non-volatile content of about 70 to about 85 weight percent based on the total composition.

The pigmented base coating composition of this invention is composed of pigments and an organic film forming composition which is a thermosetting acrylic resin. Thermosetting acrylic resins are combinations of thermoplastic acrylic polymers, i.e., hydroxy-carboxy acrylic copolymers, and amino-plast resins, the thermoplastic polymers having functional groups which coreact with the aminoplast resin to produce crosslinked films.

The coating is preferably composed of about 3 to 5 parts of pigment to 1 part of film forming resin, wherein the film forming resin contains about 5 to 50 weight percent aminoplast resin to 95 to 5 weight percent acrylic copolymer and preferably 20 to 30 weight percent aminoplast resin to 80 to 70 weight percent acrylic copolymer.

Suitable acrylic resins are hydroxy-carboxy containing copolymers. Such copolymers are prepared by polymerizing an ethylenically unsaturated aliphatic acid having one carboxyl group, a beta hydroxy alkyl ester of an ethylenically unsaturated aliphatic acid and at least one different ethylenically unsaturated monomer copolymerizable with the acid and the hydroxy monomer. The copolymers can have 0.2, to about 4 weight percent acid and 5 to 75 weight percent hydroxy monomer based on the weight of copolymer. Such copolymers have acid values of from 1 to about 50 and preferably about 8 to 20.

Suitable unsaturated aliphatic acids are acrylic acid, methacrylic acid, crotonic acid, and half esters of maleic and fumaric acid formed with saturated alcohols of 1 to 10 carbon atoms. Examples of the alcohols are methyl, ethyl, isopropyl, hexyl, benzyl, 2-ethylhexyl and decyl.

Beta hydroxy alkyl esters of unsaturated carboxylic are those resulting from the reaction of an acid listed above with an epoxide compound containing one 3-membered epoxide group and no other reactive groups. Such monoepoxides include ethylene oxide, propylene oxide, butylene oxide, isopropyl glycidyl ether, phenyl glycidyl ether, butyl glycidyl ether, glycidyl benzoate, glycidyl acetate, etc. Particularly useful hydroxy monomers are beta hydroxy propyl methacrylate, beta hydroxyethyl acrylate, beta hydroxypropyl acrylate and beta hydroxybutyl crotonate, i.e., beta hydroxyalkyl esters of unsaturated acids, wherein the alkyl group contains 2 to 4 carbon atoms and the acid contains 3 to 4 carbon atoms.

Unsaturated monomers copolymerizable with the carboxy and hydroxy monomers are those which contain a single ethylenically unsaturated group and no other groups reactive with the carboxy and hydroxy monomers. Examples of such monomers are styrene, vinyl toluene, methyl acrylate, ethyl acrylate, butyl acrylate, 2-ethylhexyl acrylate, methyl methacrylate, butyl methacrylate, ethyl crotonate, acrylonitrile, and mixtures of these monomers. These monomers include monofunctional vinyl aromatic compounds and saturated alcohol esters of acrylic, methacrylic and crotonic acids wherein the alcohols contain 1 to 20 carbon atoms.

The hydroxy-carboxy copolymers are prepared by polymerizing, under free radical catalysis, the unsaturated acid, the hydroxy monomer and the additional monomer. The copolymers can also be prepared by forming a copolymer of the acid and the additional monomer and then reacting the acid groups with a monoepoxide to form the hydroxy-carboxy copolymer.

The alkylated aminoplast resins used in admixture with the hydroxy-carboxy copolymers are obtained by the alkylation with an alkanol having from 1 to 8 carbon atoms of a condensate of an aldehyde with urea, N,N'-ethyleneurea, dicyandiamide, and aminotriazines. Aminotriazines are melamine, benzoguanamine, acetoguanamine and the like. Aldehydes include acetaldehyde and butyraldehyde, but the preferred aldehyde is formaldehyde, Alkanols include methly alcohol, isopropyl alcohol, butyl alcohol, isobutyl alcohol, 2-ethylhexyl alcohol and the like.

Aminoplast resins are made by coreacting the aldehyde and the nitrogen compound to form a methylol compound and then etherifying the methylol groups with the alcohol.

Particularly useful compositions are made from 20 to 30 weight percent of an isobutylated melamine formaldehyde resin and 70 to 80 weight percent, the total being 100, of a hydroxy carboxy containing acrylic copolymer. The copolymer preferably is made of 12 to 20 parts hydroxypropyl methacrylate, 1 to 2 parts methacrylic acid, 15 to 20 parts methyl methacrylate, 15 to 30 parts butyl acrylate and 10 to 30 parts styrene.

Pigments useful for preparing the base coat are titanium dioxide with or without extender pigments and coloring pigments, such as red oxide, iron blue, lamp black, yellow oxide, siennas and the like, i.e., any organic or inorganic pigment used in paints to impart tints and color to the paint.

The coatings are reduced to application viscosity with suitable organic solvents, such as esters, ethers, ketones, alcohols and aromatic hydrocarbons. The compositions at application viscosity generally have a non-volatile content of about 60 to 75 weight percent based on the total composition.

The undertone printing compositions (inks) used to apply the decorative undertones to the design on the hardboard are pigmented nitrocellulose based coatings. The nitrocellulose is preferably the ½ second grade. Small amounts of non-oxidizing, short-oil glyceryl phthalate types of alkyd resins can be used in admixture with the nitrocellulose resins if desired. Descriptions of nitrocellulose resins and various modifiers that can be used are described in Organic Coating Technology, vol. 1, by Payne, John Wiley & Sons, Inc., New York (1954).

Various organic and inorganic pigments are ground in with the resin base to give the proper color to the ink. Examples of such pigments are titanium dioxide, lamp black, yellow oxide, red oxide, siennas, phthalocyanine blue, quinacridones, lead chromate, lead molybdenum chromates and other color fast pigments. The pigment and resin base are used in the weight ratios of about 1 part of pigment to 1 to 2 parts of resin.

The toptone printing composition is used to apply the design details to the decorative hardboard. This ink has substantially the same components as the undertone ink. However, the pigment to resin weight ratio is somewhat higher, 2 parts of pigment being used with about 1 to 2 parts of resin.

Both undertone and toptone printing compositions are reduced to application viscosities with organic solvents, such as ethyl acetate, Cellosolve acetate, methyl ethyl ketone, butanol, toluene, xylene and the like. The non-volatile content is generally about 30 to 40 weight percent based on the total ink.

The clear protective coating that is applied to the decorative hardboard can be any clear unpigmented coating that dries quickly to a hard surface that will protect the hardboard from wear and will give the surface a lustrous appearance. The preferred coating in this invention contains 50 to 60 weight percent of an alkylated aminoplast resin and 30 to 40 weight percent of a short oil glyceryl phthalate type alkyd resin containing 30 to 40 weight percent oil modification. The oil modifiers are drying oils, semidrying oils and nondrying oils such as dehydrated castor oil, linseed oil, oiticica oil, soybean oil, tall oil, coconut oil and the like. The preferred oil modifiers are mixtures of dehydrated castor oil and coconut oil.

The aminoplast resin and the alkyd resin are reduced in organic solvents to a nonvolatile content of 40 to 55 weight percent. Suitable organic solvents include 2-ethylhexanol, butanol, Cellosolve acetate, xylene, toluene, pine oil and the like.

The following examples describe in detail the composition used to prepare the decorative hardboard. Parts, where used, are meant to be parts by weight.

EXAMPLE 1.—FILLER COAT

Part I.—Rosin-maleic anhydride adduct preparation

To a suitable reactor were added 3500 parts of water grade gum rosin, 427 parts of maleic anhydride and 576 parts of glycerine. Heat was applied raising the temperature to 450° F. At this point, all the reactants were molten and agitation was begun. The temperature was raised to 500° F. and was held at 500° F. for about 2 hours while removing the water of reaction. At the end of this heating period, the acid value was 30–40. The temperature was lowered to 480° F. and the reaction product was drawn off into storage containers.

Part II.—Modified alkyd resin preparation.

2953 parts of dehydrated castor oil, 990 parts of trimethylol propane and 3 parts of lead naphthanate driers were transesterified by heating at 460° F. until a 10 cc. sample of the reaction product was soluble in 15 cc. but insoluble in 20 cc. of 85% ethyl alcohol. At the end of this stage of the reaction, the reactants were cooled and 3174 parts of phthalic anhydride, 1131 parts of trimethylol ethane and 388 parts of the rosin-maleic anhydride adduct from Part I were added. The reactor was fitted with an azeotropic distillation well and xylene was added to the well. The temperature was raised to 380° F. to 390° F. and sufficient xylene was added to maintain a strong reflux at this temperature. The reaction was continued until about 385 parts of water of reaction were removed and the acid value of the product was 14 to 20. The resin was then reduced to 45% solids with xylene.

Part III.—Filler coat preparation 16.5 parts of titanium-calcium pigment (30% titanium dioxide and 70% calcium sulfate), 53.5 parts of barytes, 18.18 parts of the modified alkyd resin solution of Part II and 2 parts of aromatic hydrocarbon solvent having a boiling range of 271° F. to 286° F. were mixed in a Mooney mixer for 1 hour. 8.77 parts of aromatic hydrocarbon solvent having a boiling range of 216° F. to 292° F. and 0.3 part each of lead, manganese and cobalt driers were added. The resulting coating composition was then filtered through cheese cloth and was stored in closed containers.

EXAMPLE 2.—PIGMENTED BASE COAT

Part I.—Carboxy-hydroxy acrylic copolymer preparation

To a suitable reactor were added 10,951 parts of xylene and 390 parts of cumene hydroperoxide. To a mixing tank were added with stirring, 2946 parts of n-butyl methacrylate, 2492 parts of butyl acrylate, 2652 parts of methyl methacrylate, 4320 parts of styrene and 1392 parts of methacrylic acid. 1,380 parts of this mixture were added to the reactor, and heat was applied raising the temperature to 277° F. within 1 hour. The remaining mixture of monomers was added over a period of about 45 minutes. Heating at 265° F. to 277° F. was then continued for about 2 hours until substantially complete polymerization was obtained as determined by solids determination. Heating was discontinued and 2500 parts of xylene were added to the polymer solution. When the temperature reached 190° F., 42 parts of benzyl trimethyl ammonium methoxide were added to the solution. Propylene oxide, 928 parts, was then added over a period of 45 minutes. Heat was reapplied raising the temperature to 260° F. at such rate that only a slight reflux was obtained. The temperature was held at 260° F. until the acid value of the polymer was 10–13. Heat was removed and 2654 parts of n-butanol and 1444 parts of xylene were added. The resulting copolymer solution had a Gardner-Holdt viscosity of H at 25° C. and a solids content of 40 percent.

The copolymer contained 20 percent butyl methacrylate, 18 percent methyl methacrylate, 16.92 percent butyl acrylate, 29.33 percent styrene, 15.44 percent hydroxypropyl methacrylate (formed in situ) and 0.31 percent methacrylic acid. Comparable copolymers were made substituting hydroxypropyl methacrylate monomer for the methacrylic acid and propylene oxide reactants.

Part II.—Aminoplast resin preparation

To a suitable reactor were added 15,444 parts of a solution containing 9215 parts of isobutyl alcohol, 4269 parts of formaldehyde and 1960 parts of water. The pH was adjusted to 4.6 to 5.0 with formic acid. 3240 parts of melamine were added and heating at 190° F. to 200° F. was conducted for about 30 minutes until the melamine was completely dissolved. The pH was adjusted to 7.3 to 7.5 and heating was continued for 1 hour at 195° F. to 200° F. The reactor was fitted with an azeotrope distillation well and heating was continued for 2 hours at 202° F. to 260° F. while removing water and returning isobutyl alcohol to the reactor. The reactants were cooled to 210° F. and the pH was adjusted to 6.0 to 6.2 with formic acid. Heat was reapplied and distillation was continued for 5 hours by removing the water and returning the alcohol to the reactor. The reactants were cooled to 200° F. and the pH was adjusted to 7.1 to 7.3 with sodium hydroxide. The reactants were vacuum distilled using sufficient vacuum to maintain a good distillation rate at 240° F. Distillation was continued until a Gardner-Holdt viscosity of X—Y at 25° C. was obtained on 2 parts of a sample of the resin solution dissolved in 1 part of isobutyl alcohol. When this viscosity was reached, heating was discontinued and the reactants were dissolved in 6461 parts of toluene plus 287 parts of isobutyl alcohol. The resulting solution at 50 percent solids had a Gardner-Holdt viscosity of K—M.

Part III.—Base coat preparation

To a pebble mill were added 56.35 parts of titanium calcium pigment (70% calcium sulfate and 30% titanium dioxide), 22.76 parts of the copolymer solution of Part I of this example and 10.67 parts of toluene. After milling for 72 hours, the contents were removed from the mill. 6.82 parts of the aminoplast resin of Part II, this example, and 3.25 parts of toluene were mixed in. The resulting paint was filtered through a filter press and was tinted to the desired color using using tint bases made by grinding pigments, such as red oxide, iron blue, lamp black, and the like, in the copolymer solution of Part I of this example.

EXAMPLE 3.—UNDERTONE PRINTING COAT

The undertone printing coating composition was made by grinding and blending 16.2 parts of ½ second nitrocellulose with 1.5 parts titanium dioxide, 5.1 parts lampblack, 5.3 parts yellow oxide, 2 parts red oxide and 5.1 parts of a coconut oil modified alkyd resin using 64.8 parts solvent. The solvent is made up of ethyl acetate, Cellosolve acetate, butanol and xylene.

EXAMPLE 4.—TOPTONE PRINTING COAT

The topcoat printing coating composition was made by grinding and blending 8.6 parts of ½ second nitrocellulose with 2.25 parts titanium dioxide, 7.4 parts lampblack, 2.2 parts red oxide, 8.4 parts sienna, 4.9 parts of a coconut oil modified alkyd resin and 1 part of an aminoplast resin as described in Example 2, using 65.25 parts solvents as described in Example 3.

EXAMPLE 5.—CLEAR TOP COAT

Part I.—Coconut oil modified alkyd resin

To a suitable reactor were added 2737 parts of coconut oil and 889 parts of glycerine. The temperature was raised to 40° F. and 6.67 parts of metal (lead, cobalt, manganese) driers were added The temperature was then raised to 450° F. to 460° F. and was held at this temperature until a 10 cc. sample of the reactants was soluble in 85 percent ethyl alcohol. 1207 parts of glycerine, 120 parts of maleic anhydride and 3518 parts of phthalic anhydride were added. The reactor was fitted with an azeotropic distillation well and sufficient xylene was added to maintain a strong reflux at 390° F. Heating was continued at 390° F. for about 4 hours until the reactants had an acid value of 8 and about 470 parts of water of reaction were removed. The reactants were then reduced to 55 percent solids with xylene.

Part II.—Dehydrated castor oil modified alkyd resin

Using substantially the same procedure as was described in Part I, 2760 parts of dehydrated castor oil were reacted with 889 parts of glycerine using 2.7 parts of lead driers. The alcoholized product was then reacted with 1009 parts of glycerine, 3370 parts of phthalic anhydride and 400 parts of hydroabietyl alcohol to an acid value of 5–10. The resulting product was reduced to 55% solids with xylene and butanol.

Part III.—Butylated melamine formaldehyde resin No. 1

To a suitable reactor were added a mixture containing 12,360 parts butanol, 1690 parts water and 4130 parts formaldehyde. The pH was adjusted to 4.2–4.5 and 3600 parts of melamine were added. The temperature was raised to 195° F.–200° F. and was held at this temperature until the melamine had dissolved, about 30 minutes. The pH was then raised to 7.3–7.5 with sodium hydroxide and heating was continued at 195° F. to 200° F. for 1 hour. The temperature was then raised to 206° F. where water-butanol azeotropic distillation began. The water of distillation was removed and the butanol was returned to the reactor. Distillation was continued for 2 hours. The pH was then adjusted to 6.0 to 6.2 with formic acid. Azeotropic distillation was continued for 5 hours at which time the free formaldehyde content was less than 5%. The reactants were then heated under 10 inch Hg pressure at 200° F. to remove alcohol and water and to body the reactants. Heating was continued until a Gardner-Holdt viscosity at 25° C. of T—U was obtained. The reactants were then reduced to 50% solids with butanol and xylene.

Part IV.—Butylated melamine formaldehyde resin No. 2

Using the same procedure as was described in Part III of this example, 11,660 parts butanol, 4370 parts formaldehyde, and 2100 parts water were reacted with 3240 parts melamine. The reaction was carried out to obtain a product having a Gardner-Holdt viscosity at 25° C. of U—W. The resulting product was then dissolved to 60% solids with butanol and xylene.

Part V.—Clear coating preparation

To a suitable container were added 12.82 parts of the alkyd resin solution of Part I, 23.49 parts of the alkyd resin solution of Part II, 47.00 parts of aminoplast resin of Part III, 3.92 parts of the aminoplast resin of Part IV, 1.50 parts of pine oil, 0.8 part of 2-ethylhexanol, 1.25 parts of Cellosolve acetate, 3.84 parts of aromatic solvent having a boiling range of 271° F. to 286° F. and 3.93 parts of a 30% solution of monobutyl tetrachlorophthalate in butanol. The components were stirred until a clear solution was obtained.

By the process of this invention, hardboard can be made having a variety of designs. Particularly striking designs can be made by using metallic pigments in the undertone printing inks which give the designs an appearance of depth. A design having the appearance of Milano marble has been made by printing the hardboard with an undertone ink using a rotogravure printer with an etched Milano marble pattern and applying on this print a toptone ink by an identical Milano etched cylinder, wherein the second pattern was the reverse of the first.

It is to be understood that the foregoing detailed description is given merely by way of illustration and that many variations may be made therein without departing from the spirit of the invention.

The embodiments of the invention in which an exclusive property or privilege is claimed are defined as follows:

1. As an article of manufacture, hardboard coated with a tightly adherent coating made up of a plurality of tightly adherent baked superposed layers comprised of (in sequence):
  (a) a filler coat
  (b) a pigmented base coat
  (c) an undertone printing coat
  (d) a toptone printing coat, and
  (e) a clear protective coat
wherein the filler coat (a) is comprised of extender pigments and an organic film forming composition in the weight ratio of about 4 to 10 parts of pigment to 1 part of film former wherein the organic film former is an alkyd resin modified with 30 to 40 weight percent drying oil and 3 to 6 weight percent rosin-maleic anhydride adduct, the percentages being based on the total weight of the film forming composition; the pigmented base coat (b) is comprised of pigments and an organic film forming composition in the weight ratio of about 3 to 5 parts of pigment to 1 part of film forming resin wherein the organic film former is a thermosetting acrylic resin, said acrylic resin being a combination of 5 to 50 weight percent aminoplast resin and 95 to 50 weight percent, the total being 100, hydroxy-carboxy containing acrylic copolymer, wherein the acrylic copolymer is a copolymer of 0.2 to 4 weight percent of an ethylenically unsaturated monocarboxylic acid, 5 to 75 weight percent of a beta hydroxyalkyl ester of an ethylenically unsaturated monocarboxylic acid, the percentages being based on the total weight of the copolymer, and a different ethylenically unsaturated monomer copolymerizable therewith, said copolymer having an acid value of about 1 to 50;

the undertone printing coat (c) is comprised of pigments and organic film forming composition in the weight ratio of about 1 part of pigment to 1 to 2 parts of film former wherein the organic film former is a nitrocellulose base resin;

the toptone printing coat (d) is comprised of pigments and organic film forming composition in the weight ratio of about 2 parts of pigment to 1 to 2 parts of film former wherein the organic film former is a nitrocellulose resin; and the clear protective coat (e) is comprised of an unpigmented organic film forming composition of 50 to 60 weight percent of an alkylated aminoplast resin and 30 to 40 weight percent, the total being 100, of a short oil glyceryl phthalate type alkyd resin, wherein the oil modification is 30 to 40 weight percent of the alkyd resin.

2. The article of claim 1 wherein the alkyd resin composition of (a) the filler coat is comprised of, by weight, 30 to 40 parts of dehydrated castor oil, 50 to 60 parts of trimethylol ethane phthalate and 3 to 6 parts of rosin-maleic anhydride adduct; and the thermosetting acrylic resin of (b) the pigmented base coat is comprised of 20 to 30 weight percent of an isobutylated melamine formaldehyde resin and 70 to 80 weight percent, the total being 100, of hydroxy-carboxy containing acrylic copolymer wherein the acrylic copolymer is a copolymer of, by weight, 20 to 25 parts butyl methacrylate, 15 to 20 parts methyl methacrylate, 15 to 30 parts butyl acrylate, 10 to 30 parts styrene, 12 to 20 parts hydroxypropyl methacrylate and 1 to 2 parts methacrylic acid.

3. The article of claim 2 wherein the nitrocellulose base resin of (c) the undertone printing coat is ½ second nitrocellulose modified with 20 to 30 weight percent, based on the total weight of the resin composition, of a coconut oil modified glyceryl phthalate alkyd resin; and the nitrocellulose base resin of (d) the toptone printing coat is ½ second nitrocellulose modified with 30 to 40 weight percent of a coconut oil modified glyceryl phthalate alkyd resin and 0 to 10 weight percent of a butylated melamine formaldehyde resin, the percentages being based on the total weight of the resin composition.

4. The article of claim 2 wherein the film forming composition of (e) the clear protective coating is comprised of, by weight, 50 to 60 parts of a butylated melamine formaldehyde resin, 10 to 20 parts of a coconut oil modified glyceryl phthalate alkyd resin containing 30 to 40 weight percent coconut oil based on the resin and 20 to 30 parts of a dehydrated castor oil modified glyceryl phthalate resin containing 30 to 40 weight percent dehydrated castor oil based on the resin.

References Cited
UNITED STATES PATENTS

| | | | |
|---|---|---|---|
| 1,927,086 | 9/1933 | Ellis | 117—72 |
| 2,363,658 | 11/1944 | Decker | 117—72 X |
| 2,441,953 | 5/1948 | Berry et al. | 117—72 |

WILLIAM D. MARTIN, *Primary Examiner.*

R. HUSACK, *Assistant Examiner.*

U.S. Cl. X.R.

117—45, 67, 72, 73